(12) United States Patent
Kincheloe

(10) Patent No.: US 8,496,405 B1
(45) Date of Patent: *Jul. 30, 2013

(54) MITRED GRATE AND DRAIN COVER

(76) Inventor: John Kincheloe, Windsor, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/798,564

(22) Filed: Apr. 7, 2010

Related U.S. Application Data

(63) Continuation-in-part of application No. 11/890,449, filed on Aug. 6, 2007, now Pat. No. 7,695,216, which is a continuation-in-part of application No. 11/212,152, filed on Aug. 26, 2005, now Pat. No. 7,252,458, which is a continuation-in-part of application No. 10/459,872, filed on Jun. 12, 2003, now Pat. No. 6,942,425, which is a continuation-in-part of application No. 09/826,641, filed on Apr. 5, 2001, now Pat. No. 6,595,721.

(51) Int. Cl.
*E03F 5/14* (2006.01)
(52) U.S. Cl.
USPC ............... 405/125; 405/127; 405/36; 405/41; 210/163; 210/460
(58) Field of Classification Search
USPC ................. 405/36, 39, 40, 42, 124, 125, 126, 405/127; 210/154, 162, 163, 459, 460
See application file for complete search history.

(56) References Cited

U.S. PATENT DOCUMENTS

| | | | | |
|---|---|---|---|---|
| 830,112 | A * | 9/1906 | Tenold | 210/153 |
| 928,481 | A * | 7/1909 | Tenold | 210/460 |
| 961,834 | A * | 6/1910 | Barlett | 210/131 |
| 3,086,655 | A * | 4/1963 | Compton | 405/127 |
| 3,587,239 | A * | 6/1971 | Feland et al. | 405/125 |
| 4,713,179 | A * | 12/1987 | Goedderz, Sr. | 405/124 |
| 5,037,542 | A * | 8/1991 | Carroll | 405/124 |
| 5,102,537 | A * | 4/1992 | Jones | 405/127 |
| 6,224,292 | B1 * | 5/2001 | Akalin | 404/26 |
| 6,447,206 | B1 * | 9/2002 | Fleury | 405/125 |
| 6,595,721 | B2 * | 7/2003 | Kincheloe | 405/125 |
| 6,942,425 | B2 * | 9/2005 | Kincheloe | 405/125 |
| 7,252,458 | B2 * | 8/2007 | Kincheloe | 405/125 |
| 7,695,216 | B2 * | 4/2010 | Kincheloe | 405/125 |

* cited by examiner

*Primary Examiner* — Frederick L Lagman
(74) *Attorney, Agent, or Firm* — Colin P. Abrahams

(57) ABSTRACT

A drain cover and pipe combination comprises a drain cover including a substantially elliptical frame portion defining a space, the space having an axis substantially normal to the frame, and at least one cross piece located in the space so as to define a plurality of openings in the drain cover. The pipe comprises a substantially tubular member having a longitudinal axis, with the pipe having a substantially elliptical shaped rim at one end thereof with a rim axis which is other than parallel to the longitudinal axis of the tubular member. Securing means are provided for securing the drain cover over the rim of the pipe.

10 Claims, 12 Drawing Sheets

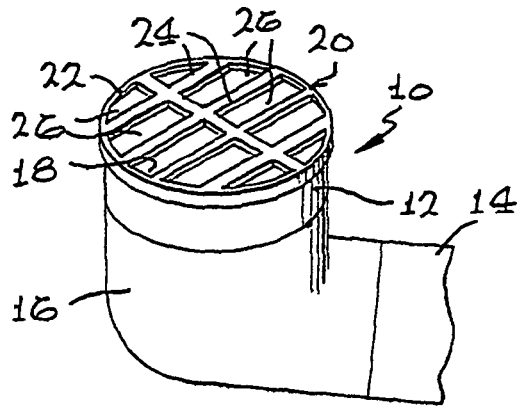
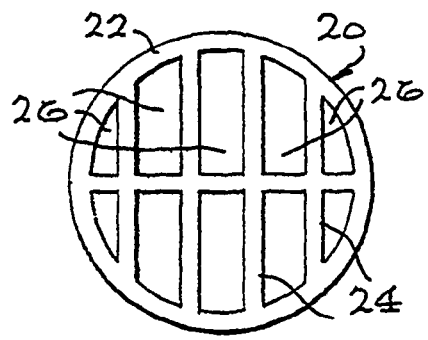
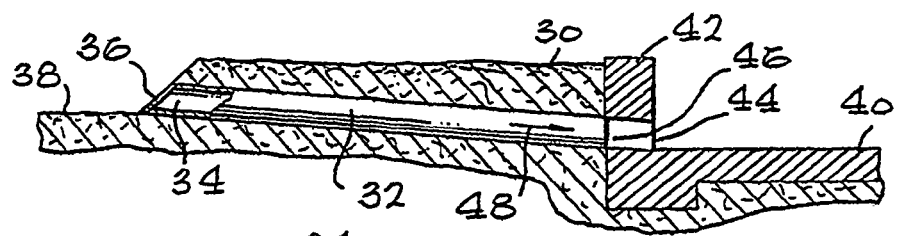
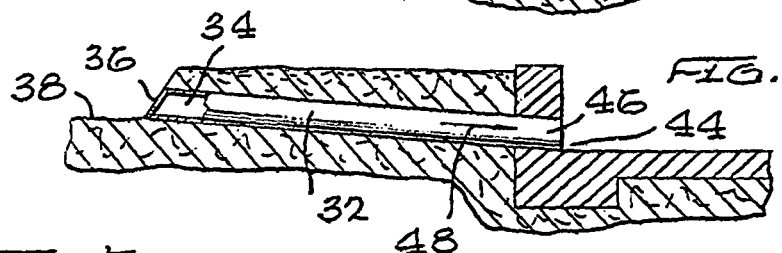
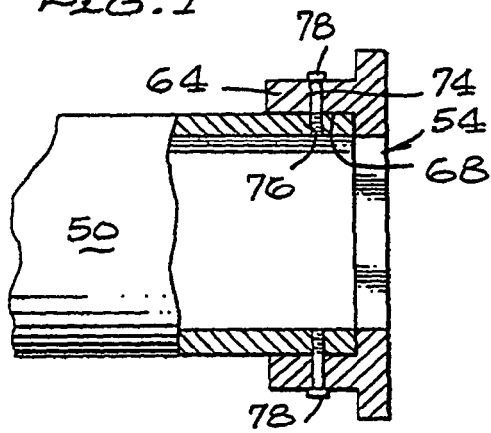
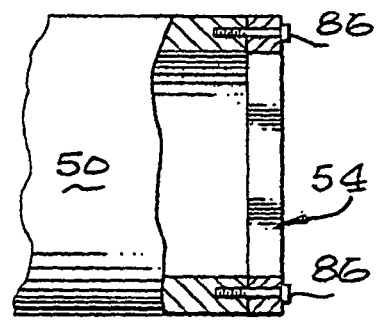

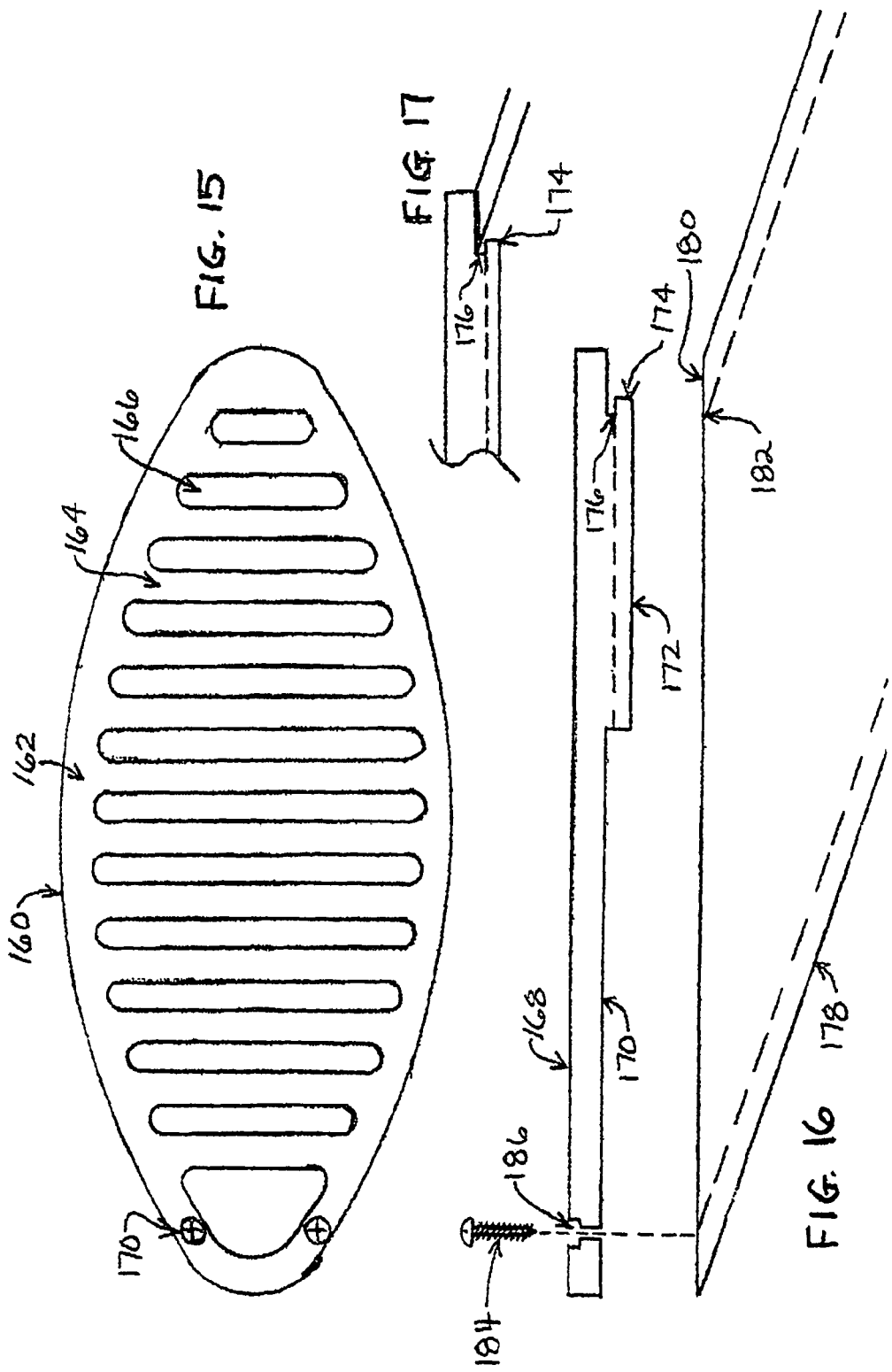

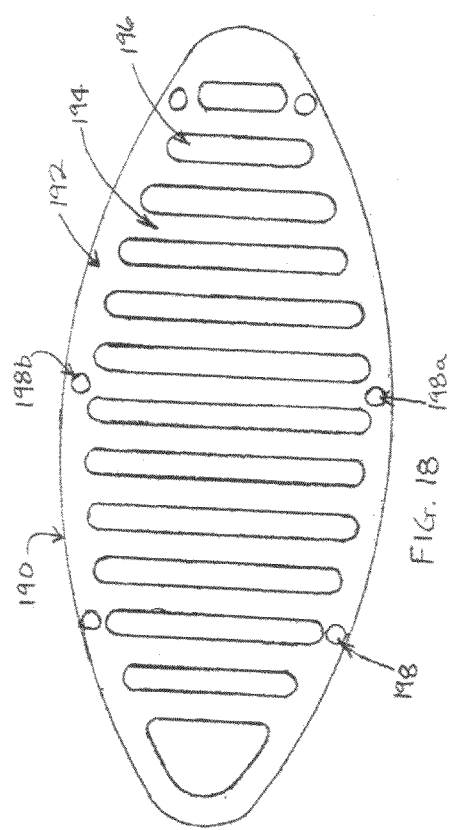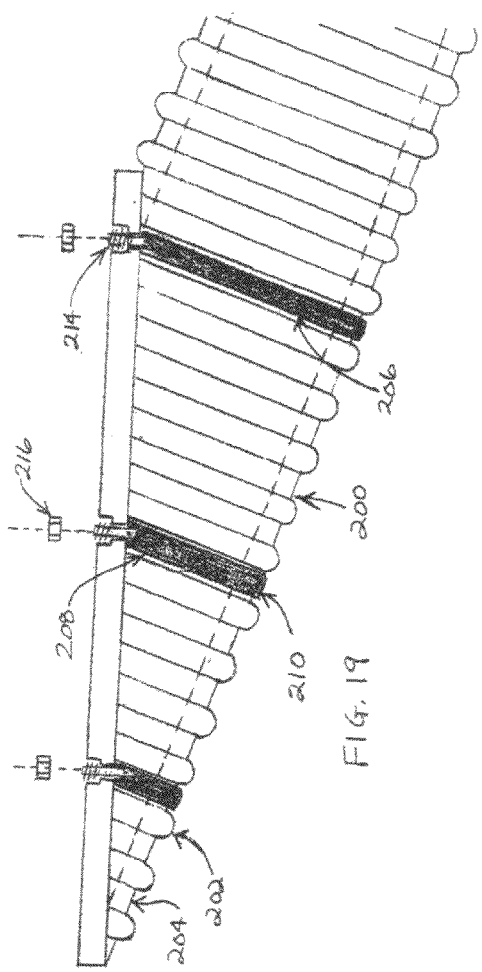

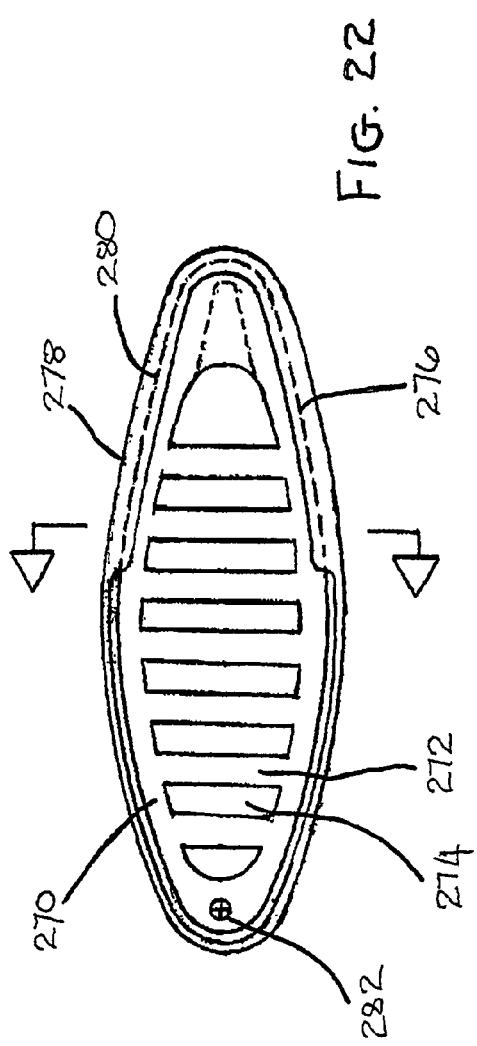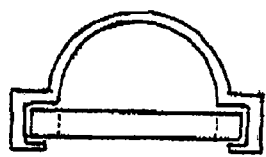

MITRED GRATE AND DRAIN COVER

CROSS REFERENCE TO RELATED APPLICATIONS

This is a continuation in part application of U.S. patent application Ser. No. 11/890,449 filed Aug. 6, 2007, now U.S. Pat. No. 7,695,216, which is a continuation in part of U.S. patent application Ser. No. 11/212,152 filed Aug. 26, 2005, now U.S. Pat. No. 7,252,458 which is a continuation in part application of U.S. patent application Ser. No. 10/459,872 filed Jun. 12, 2003, now U.S. Pat. No. 6,942,425, which is a continuation in part application of U.S. patent application Ser. No. 09/826,641 filed Apr. 5, 2001, now U.S. Pat. No. 6,595,721 issued Jul. 22, 2003, both of which are incorporated herein by reference in their entirety.

FIELD AND BACKGROUND OF THE INVENTION

This invention relates to mitred grates and drain covers. More particularly, the invention relates to drain covers and grates, with or without drain pipes, for use on sloped or inclined surfaces.

Drainage pipes play an important role in the design and structure of buildings, landscaping and the like in order to permit collected or run-off water to be removed from areas, and to conduct the flow of such water to city drainage installations. A typical drainage pipe may be located adjacent a building, or in a parking lot or other landscape structures, with a drain cover or grate closing off the pipe. The drain cover or grate is preferably flush with the surface, and permits water run-off to flew through the grate, and into the pipe for further removal.

It is an inherent feature of the drainage pipes that they slope from the water collection point, namely, at the open end of the pipe (or the pipe flow entrance) including the grate or drainage cover, and that the pipes slope therefrom to a street gutter, curb, or the next stage of the sewer system. These pipes will, therefore, often flow under parking lots, sidewalks or other areas, in carrying the collected water from the pipe flow-line entrance to the street or guttering for further removal.

Existing drainpipes typically comprise a series of pipes which have a water-flow entrance, and which are located in the area to be drained, a series of connected piping through which the water can flow, and an outlet at a remote end from the water flow entrance, where water flowing through the pipe is discharged for further removal through other sewer systems.

In a typical form, the grates or pipe covers which are placed over the drain pipe at the flow-water entrance end are circular, corresponding substantially in size to the diameter of the drain pipe. These grates are necessary, and perform an important function, in that they permit the free flow of water from the collection area into the drain pipe, but prevent larger objects from entering the drain pipe and ultimately blocking the system.

Therefore, the drain pipe covers and grates provide a useful and indispensable function, allowing the drainage of water, but selectively, depending upon the size and configuration of the grate, preventing small stones, sticks or other items from causing a blockage in the system.

SUMMARY OF THE INVENTION

According to one aspect of the invention, there is provided a drain cover and pipe combination, the combination comprising a drain cover including a substantially elliptical frame portion defining a space, the space having an axis substantially normal to the frame, and at least one cross piece located in the space so as to define a plurality of openings in the drain cover; a pipe comprising a substantially tubular member having a longitudinal axis, the pipe having a substantially elliptical shaped rim at one end thereof with a rim axis which is other than parallel to the longitudinal axis of the tubular member; and securing means for securing the drain cover over the rim of the pipe.

According to another aspect of the invention, there is provided a mitred grate and drain cover comprising: a peripheral edge having an upper and lower surface and a substantially elliptical shape which defines a space, and a plurality of cross pieces within the space; depending sidewalls extending from the lower surface of the peripheral edge, the sidewalls being constructed with respect to the peripheral edge such that they are at an angle other than 90° to the peripheral edge, the sidewalls defining a space for receiving a pipe.

Preferably, the mitred grate and drain cover further comprises securing means for securing the grate and drain cover to a pipe. The grate or drain cover can be used both as an inlet and an outlet.

According to another aspect of the invention, there is provided a drain cover comprising a grate having peripheral edge defining a space and at least one cross piece extending within the space, the grate having an upper surface and lower surface; and depending sidewalls extending from the lower surface of the grate, and constructed at an angle thereto other than 90°.

Preferably, the peripheral edge and sidewalls define a receiving space for receiving a pipe having an open end which is received within the space. Securing means for securing the grate to a pipe may also be provided.

In yet a further aspect of the invention, there is provided a mitred grate and drain cover comprising an elliptical peripheral edge defining a space and at least one cross piece located in the space so as to define a plurality of openings in the grate, and securing means for securing the grate to an end of a pipe.

The invention therefore provides for a grate or pipe cover for use in drainage systems, the grate being of a substantially elliptical or similar such shape, so that it fits over a pipe which has been cut obliquely, rather than in a direction substantially normal to the flow of water therein. This arrangement of an oblique or mitred grate permits increased flexibility in locating drain pipes and their cover grates, making it no longer necessary to have the grate or drain pipe cover on a substantially vertical pipe, as is the present situation. Thus, the water inflow end of the pipe can be sloped all the way up to the surface, providing greater flexibility to design engineers where only a very slight slope is permitted due to the lie of the land. This flexibility is achieved by avoiding the need for the vertical component upon which the substantially round grate is placed, sometimes providing as much as an additional 6-18 or more inches of vertical height, depending upon the pipe size, which could otherwise be used to slope the pipe.

Another advantage of the present invention is that the open end of the pipe, with the mitred grate, presents a significantly larger surface area to water being drained, and is therefore able to achieve higher levels of drainage than may have been possible with the smaller surface area round grate covering a pipe of approximately equivalent diameter. The oblique or mitred grate of the invention can also be used so that the angle at which the pipe is cut, causes the resulting opening to be essentially flush with any surface at which the water inlet end is located, whether the surface is horizontal, somewhat inclined, or closer to vertical, as a curb or sidewalk edge may be.

At the same time, while permitting a greater inflow of water, the grate prevents, to the same extent as any other grate, the influx of debris and landscape materials entering the pipe, which either causes clogging of the pipe or the conveyance of debris to the street where it may create an unsightly mess.

BRIEF DESCRIPTION OF THE DRAWINGS

FIG. 1 is a perspective view of a drainpipe and grate typical of the prior art;

FIG. 2 is a top view of the grate shown in FIG. 1 of the drawings;

FIG. 3 is a diagrammatic representation of the drain cover and grate with pipe of the invention constructed beneath a sidewalk;

FIG. 4 is a diagrammatic representation of the drain cover and grate with pipe of the invention constructed adjacent to the curb, without a sidewalk;

FIG. 7 is a cross-section through lines B-B in FIG. 5 of the drawings;

FIG. 8 is a cross-section through similar to FIG. 7 of the drawings, but showing another embodiment;

FIG. 15 is a plan view of a grate in accordance with a further embodiment of the invention;

FIG. 16 is a side view in section of the grate shown in FIG. 15 of the drawings, located over a pipe;

FIG. 17 is a detailed view showing one aspect of the connection of the grate with the pipe;

FIG. 18 is a plan view of a grate in accordance with a further aspect of the present invention;

FIG. 19 is a section through the grate shown in FIG. 18, and a pipe to which it has been attached;

FIG. 22 is a top view of a grate in accordance with yet another aspect of the invention;

FIG. 23 is a section view of the grate as shown in FIG. 22 of the drawings;

FIG. 32(*b*) is a detail of the hinge shown in FIG. 32(*a*) of the drawings;

FIG. 33(*b*) is a detail of the hinge shown in FIG. 33(*a*) of the drawings.

DETAILED DESCRIPTION OF THE INVENTION

Figure 5:
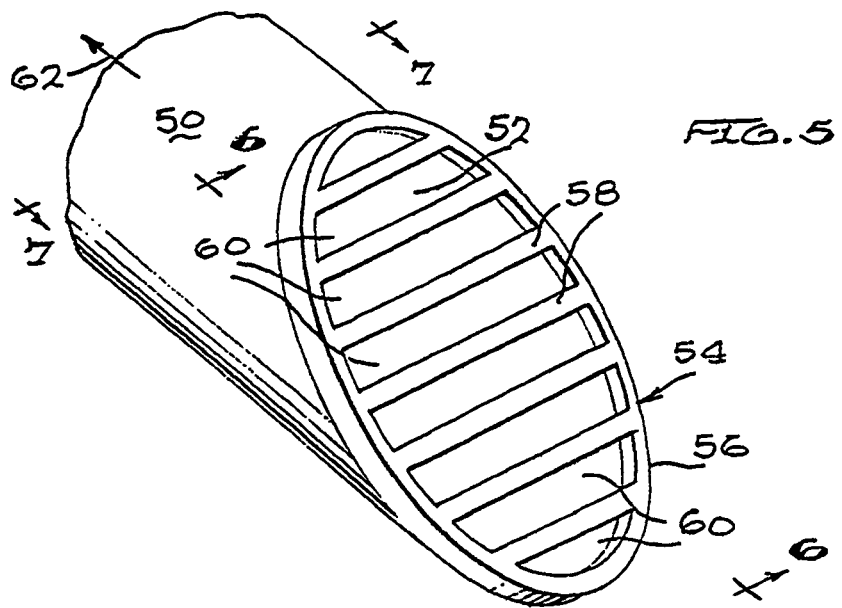
FIG. 5 is a perspective view of the drain pipe and grate cover, in accordance with the invention.

The invention is, in one aspect, for a mitred grate or drain cover, particularly for use in conjunction with a drain pipe having an obliquely cut end, the combination of the grate and drain pipe providing increased drainage surface area for a pipe of predetermined diameter, thereby permitting drainage of greater quantities of water. The grate and/or drain pipe of the invention also provide the ability whereby the grate is able to mesh in with the various inclined or sloped surfaces in a construction site or in landscaping. Further, the obliquely cut drainage pipe, and grate which fits thereover, permits more effective use of slope available for the drainage pipe over a given area, especially where only a very short vertical distance and relatively little slope is permitted by the characteristics of the area. In other words, a conventional pipe and grate where a vertical component is required would require a greater vertical distance to be sloped at a given angle than the drain pipe and cover of the invention, where no such vertical component is necessary.

Reference is now made to FIGS. 1 and 2 of the drawings, which show prior art grates and piping. In FIG. 1, a drain pipe and grate combination 10 comprises a vertical pipe 12, a sloping pipe 14 and an elbow connector 16 between the vertical pipe 12 and the sloping pipe 14. The vertical pipe 12 is cut normal to the axis of thereof so as to define an open end 18. The open end 18 is fitted with a grate or pipe cover 20 which covers the open end 18.

As will be seen in FIG. 2, which is a top view of the grate 20, the grate 20 comprises an annular ring portion 22, and various cross pieces 24. The cross pieces 24 and annular ring portion 22 which make up the grate 20 are in use, flush with the surface they are built in to, and permit water to flow from the surrounding area into the vertical pipe 12 for removal. Water runs through openings 26 defined by the cross pieces 24 of the grate 20, into the vertical pipe 12, through elbow 16, and then into the sloping pipe 14 where it is conveyed to a curbside gutter, or to a city sewerage system or the like. The grate 20 is constructed such that the cross pieces 24 will prevent larger objects from entering the vertical pipe 12, and, therefore, stones, twigs or other items which may potentially block the pipes 12 and 14, and obstruct the water and proper drainage, are caught and prevented from entering the pipe.

Reference is now made to FIG. 3 of the drawings which shows a diagrammatic representation of the drain cover and grate in accordance with the present invention. In FIG. 3, there is shown diagrammatically a sidewalk 30, the upper surface of which may be comprised of dirt, concrete, grass or such other material as may be conventional. Below the sidewalk, there is located a pipe 32 having an open end 34. The open end 34 is covered by a grate 36, and the open end 34 and grate 36 are located near a surface, designated by reference numeral 38, in which water is directed, or collects, and from which the water is to flow into the pipe 32 for drainage purposes.

Also shown in FIG. 3 in a schematic manner is a street pavement 40, a curb 42, and a gutter 44, defined between the pavement 40 and the curb 42. The pipe 32 extends in a sloping manner under the sidewalk 30, terminating in end 46, which opens into the gutter 44. Thus, water which collects at surface 38 flows through the grate 36, into the pipe 32 and out through the end 46 into the gutter where it will flow for further collection in the city sewerage drainage system or the like. In FIG. 3, the reference numeral 48 indicates the flow direction of the water from the end 34 to the end 46, the flow being permitted by the slope or inclined nature at which the pipe 32 is located in the ground.

It will be noted at this point that the open end 34 is mitred, or cut obliquely, along the pipe 32, so that it defines an elliptical opening, as opposed to a substantially circular opening in conventional drainage pipes, as shown in FIGS. 1 and 2 of the drawings.

Reference is now made to FIG. 4 of the drawings, which shows a diagrammatic representation of a drain cover and grate with pipe of the invention, much the same as shown in FIG. 3, except that in FIG. 4 there is no sidewalk. In FIGS. 3 and 4, the same reference numerals have been used to identify corresponding elements. Thus, FIG. 4 shows a sloped pipe 32, having an opening 34 for defining the flow entrance for water, covered by a grate 36. Water flows through the pipe in the direction indicated by arrow 48, eventually reaching the end 46 for discharge into the gutter 44 adjacent the pavement 40. Thus, water accumulating, collecting or directed to the surface 38 will ultimately pass through the grate 36, and into the pipe for drainage purposes.

FIG. 5 shows a detailed view of the pipe and grate of the invention. In FIG. 5, there is shown the end portion of a pipe 50, having an open end 52 on which is mounted a grate 54. The grate 54 comprises a peripheral edge 56, and a plurality of transverse pieces 58 defining a plurality of openings 60. The pipe end 52 is cut obliquely, or mitred, and not, as is common in the prior art, at right angles to the direction of water flow, indicated by arrow 62.

Figure 6:
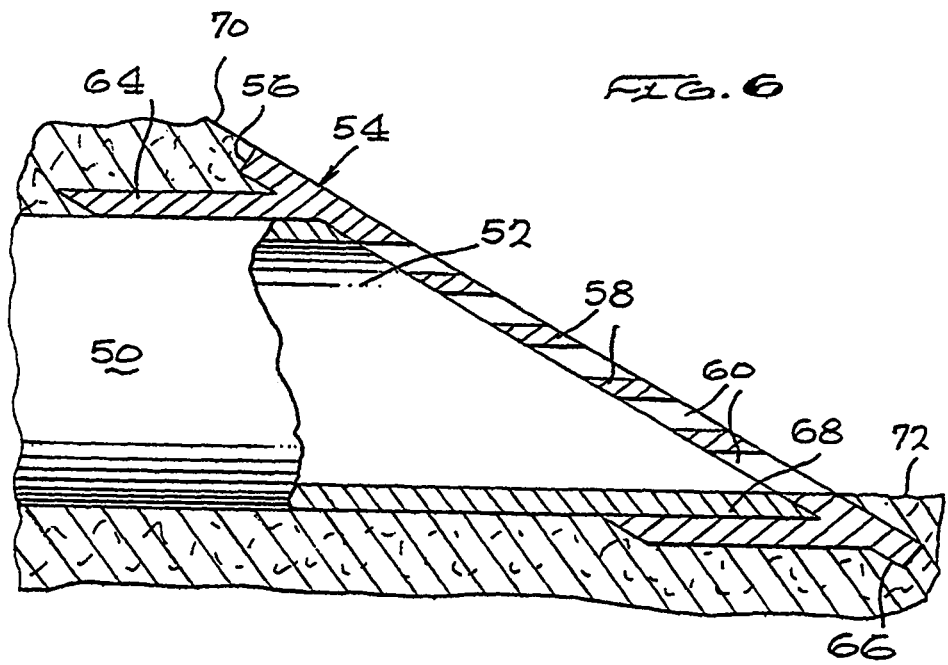
FIG. 6 is a cross-section along line A-A in FIG. 5 of the drawings.

FIG. 6 of the drawings shows a cross-section through the pipe 50 and grate 54 shown in FIG. 5, along line A-A thereof. With reference to FIG. 6, the grate 54 comprises the peripheral edge 56, and cylindrical sidewalls 64 extending form the inner surface 66 of the peripheral edge 56. The peripheral edge 56 and sidewalls 64 define a receiving space 68, in which is received the end 52 of the pipe 50. FIG. 6 clearly illustrates the oblique or mitred cut of the pipe 50. In use, the end 52 of the pipe 50 slides into the receiving space 68, and is firmly attached thereto by bolts or screws, as will be described.

It will be noted in FIG. 6 that the sidewall 64 depending from the inner surface 66 of the peripheral edge 56 is at an angle other than 90°, or normal to, the plane of the grate 54. It will be appreciated that this angle can be appropriately constructed and configured for a particular purpose, although certain common constructions having recurring usages may be appropriate. Possibly the more common angles are those provided by a two-to-one or a three-to-one incline.

It will also be seen in FIG. 6 that the pipe 50 and grate 54 are constructed, in this case, into a surface 70, and are flush with that surface 70. This surface 70 may comprise grass, dirt, concrete or the like. Water may run down this surface, or indeed the horizontal surface 72, for collection and drainage through the grate 54 and pipe 50 for further treatment.

Reference is made to FIG. 7 of the drawings, showing a section through the grate and pipe of FIG. 5, along lines B-B thereof. The grate 54 includes the sidewalls 64 thereof, defining the receiving space 68 in which the end 52 of the pipe 50 is received. The sidewall 64 includes one or more holes 74 at different positions around the circumference of the sidewall 64. The pipe 50 has corresponding or registering holes 76, and the pipe 50 is located within the receiving space 68, so that the holes 74 and 76 are aligned with each other. A screw (self-tapping or otherwise) or bolt 78 extends through the holes 74 and 76 in order to firmly secure the grate 54 to the pipe 50.

The grate 54 may be constructed of metal, brass, plastic, cast iron, polyethylene or other appropriate materials. Further, the grate can be manufactured with or without the flange or sidewalls 64. Where such sidewall 64 forms part of the grate 54, attachment may be in a manner illustrated in FIG. 7 of the drawings. However, if no such sidewalls 64 are provided, various other methods of attaching the grate to the end of the pipe can be used. These may include holes in the peripheral edge 56 of the grate 54, through which screws may pass to securely attach to the wall of the pipe 50, in conventional manner. Alternately, attachment may be effected by glue or friction type clips on the inside or outside of the pipe.

FIG. 8 shows another embodiment where the grate is attached to the end of the pipe by screws 86, in the situation where the pipe has no side walls.

Figure 9:
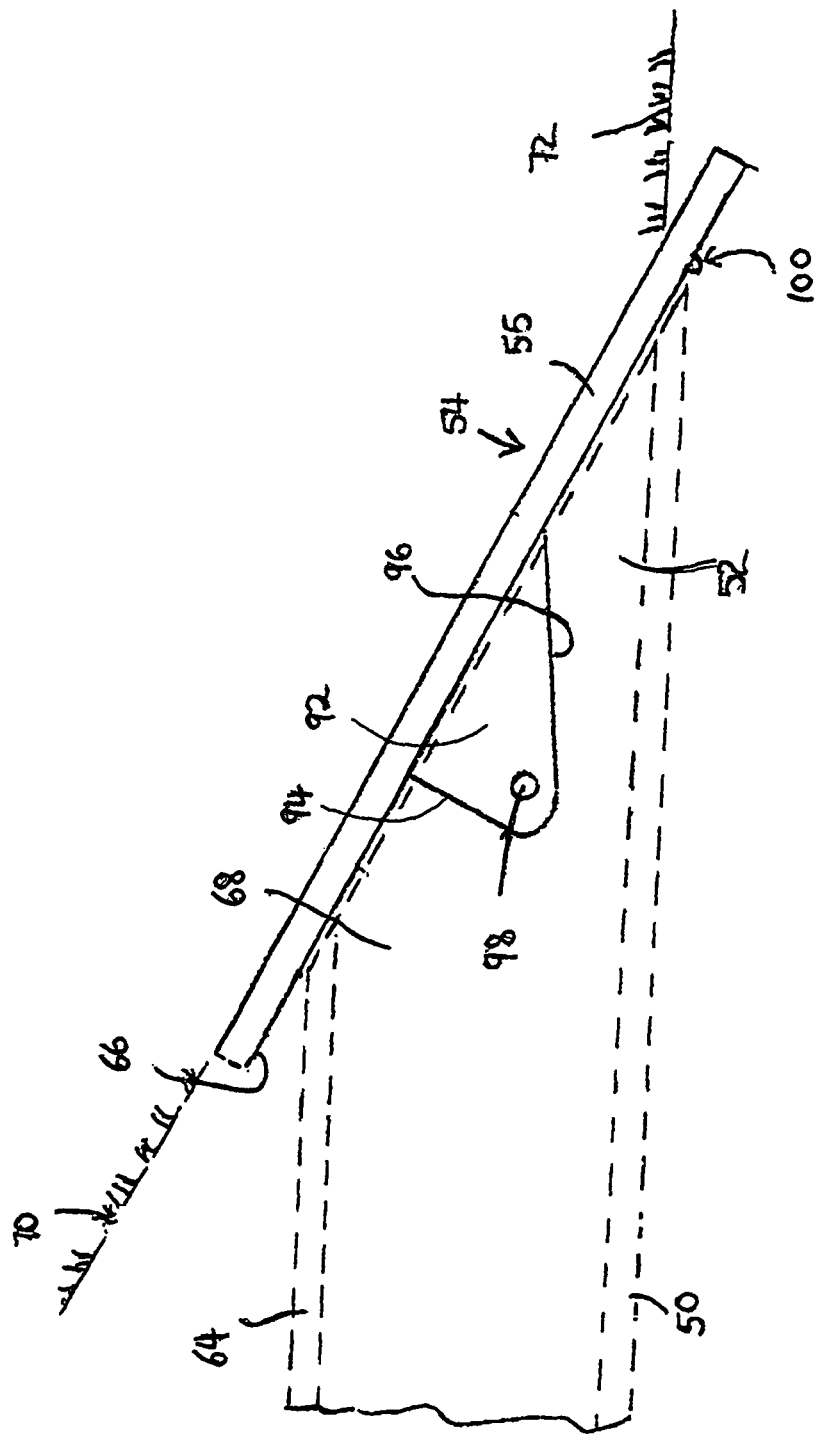
FIG. 9 is a cross-section through the drain cover and grate with pipe of the invention showing another embodiment by means of which the grate can be affixed to the pipe.

FIG. 9 of the drawings shows a another embodiment of the drain cover and pipe of the invention with an alternative mechanism for connecting the two components together. In this Figure, like reference numerals will be used to identify corresponding components to those in the earlier embodiments described. Thus, a pipe 50 having an end 52 is formed under a surface 70, and horizontal surface 72, and is covered by a drain cover or grate 54. In this embodiment, the grate 54 has a depending flange 92 of more or less triangular shape, having an edge 94 substantially normal to the grate 54, and an angled edge 96. The flange 92 forms a plate, and includes an aperture 98 therein which can receive a screw, bolt, or other connecting means for securing the grate 54 to the end 52 of the pipe 50. The flange 92 will be secured in much the same way as is described and illustrated with respect to FIG. 6 above.

One of a plurality of nipples 100 can be suitably placed on the grate in order to provide a stop for the pipe 50, which helps to ensure that every pipe is properly located and mounted with respect to the grate 54, thereby facilitating and simplifying the installation process.

Figure 10:
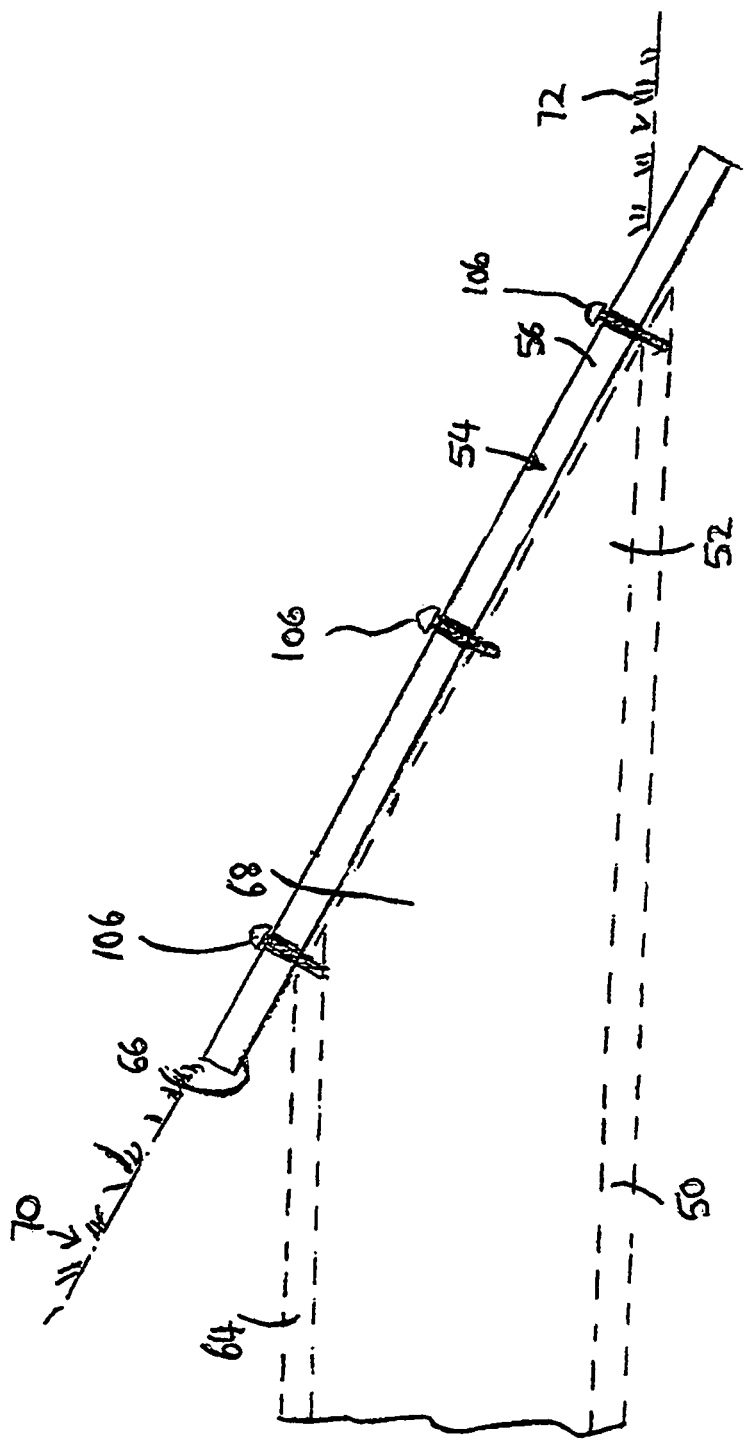
FIG. 10 shows yet a further embodiment of the invention by means of which the grate can be affixed to the pipe.

Turning to FIG. 10 of the drawings, there is shown yet a further embodiment for attaching a grate 54 to a pipe 50. In this Figure, where appropriate, similar reference numerals will be used for corresponding components shown in earlier Figures. The mechanism by which the grate 54 is attached to the end 52 of the pipe 50, as shown in FIG. 10 is by the use of a plurality of screws 106, which may be suitably located around the periphery of the grate so as to provide a secure connection. The screws 106 insert directly into the wall of the pipe 50. Additionally, there may optionally be a layer of glue between the end 52 of the pipe 50 and the grate 54.

Figure 11:
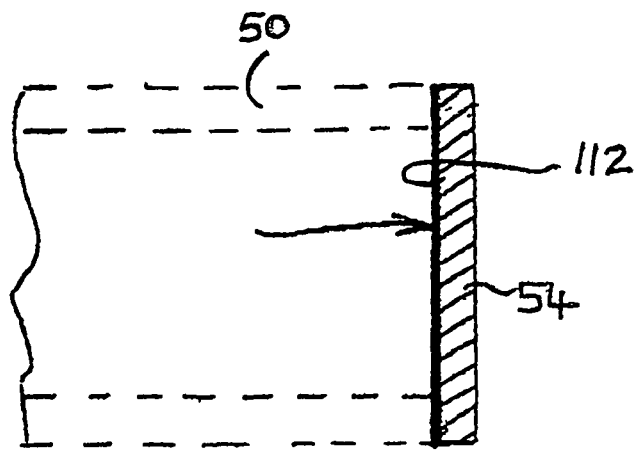
FIG. 11 is yet a further embodiment, in cross-section, showing attachment of a grate to a pipe.

FIG. 11 illustrates an embodiment of the invention wherein the grate 54 is glued to the pipe 50. FIG. 11 shows a continuous layer of glue or epoxy 112 formed between the undersurface of the grate 54 and the peripheral outer edges of the pipe 50. It is to be noted that the option of the glue or epoxy connection may be used with or without bolts, screws or the like. Epoxy or glue may be appropriate, for example, for smaller diameter pipes, or where the flow of water and/or exposure of the grate 54 may be reduced, or where the drain cover is not subject to high traffic.

Figure 12:
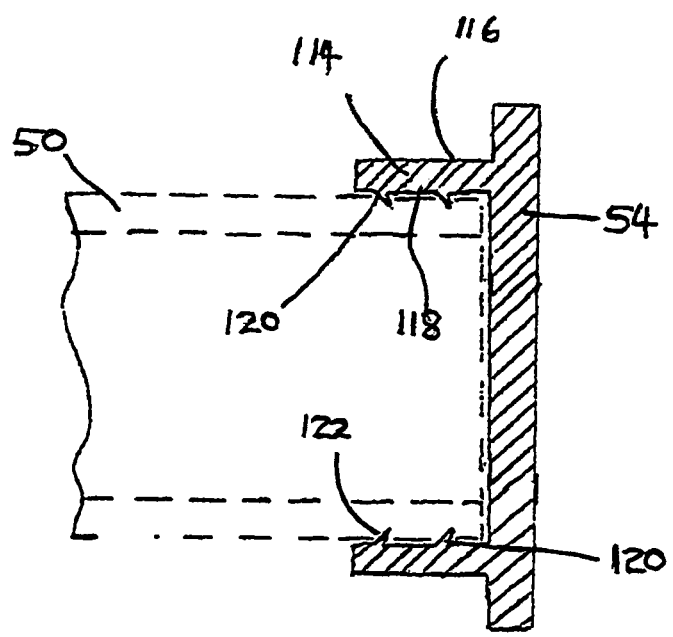
FIG. 12 is yet a further embodiment, in cross-section, showing attachment of a grate to a pipe.

FIG. 12 shows yet another embodiment of the invention whereby the grate 54 can be attached to the pipe 50. The grate 54 has downwardly depending side walls 114, having an outer surface 116 and an inner surface 118. A saw-tooth, or other, shaped projection 120 is formed on the inner surface 118, and a correspondingly shaped recess 122 is formed on the outer wall of the pipe 50. The projection 120, when the grate 54 is forced over the end of the pipe 50, engages in the recesses 122. It will be appreciated that the shape, and direction of movement when securing the components, of each of the projections 120 make it feasible for the grate 54 to slide over the pipe 50 so that the projections 120 can engage within the recesses 122, but it will be very difficult to, under normal circumstances, remove the grate 54. This can be achieved either by lightly expanding the side wall 116, and/or pressing in the pipe 150. Otherwise, the projections 120 are likely to break before the grate 54 can be removed from the pipe 50.

In the embodiment shown in FIG. 12, it will be seen that there are two rows of protections 120, and in accordance with the principles of the invention, the grate 54 need not have two projections, but can have only one, or any other suitable number. It should also be appreciated that the projections, in another embodiment of the invention which is not illustrated, may be formed on the outside of the pipe, with corresponding recesses on the side walls of the grate. Moreover, a combination of recesses and projections either on the inside of the side wall 116, or on the outside of the pipe 50, may also be used.

Figure 13:
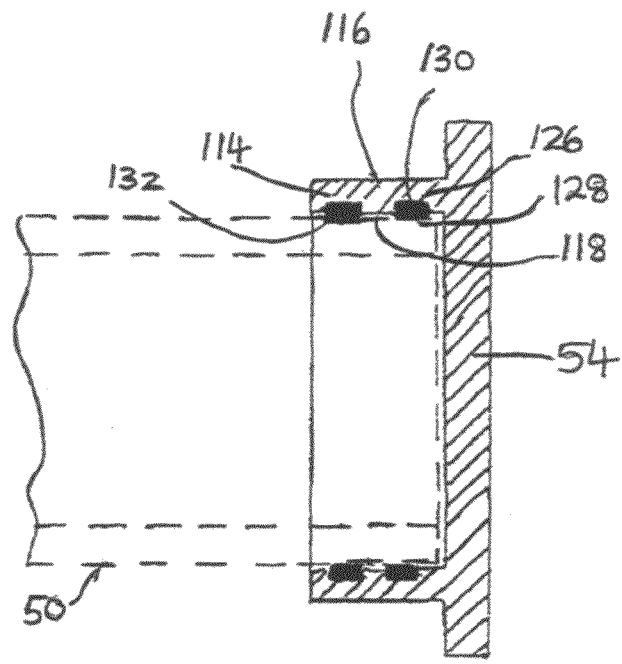
FIG. 13 is yet a further embodiment, in cross-section, showing attachment of a grate to a pipe.

Reference is now made to FIG. 13, which shows yet a further embodiment by means of which the grate 54 can be attached to the pipe 50. As was the case in FIG. 12, the grate 54 has depending side walls 114 having an outer surface 116 and an inner surface 118. The inner surface 118 of the side walls 114, and/or the outer surface of the pipe 50 may be formed with registering recesses 126 and 128 respectively, together defining a space 130 in which is located a compression-type ring 132. When the grate 54, with the ring 132, is forced over the pipe 50, the ring 132 will engage both of the recesses 126 and 128 on the grate 54 and pipe 50 respectively, thus keeping the grate 54 firmly secured on the pipe.

Alternatives to FIG. 13 may be the provision of only one ring, or three or more rings, as opposed to the two shown in the Figure. Further, the space 130 defined between the recesses 126 and 128 is generally of rectangular shape, as shown in FIG. 13, but the recesses may be of any suitable shape so as to define a space 130 of desired dimension and shape.

Figure 14:
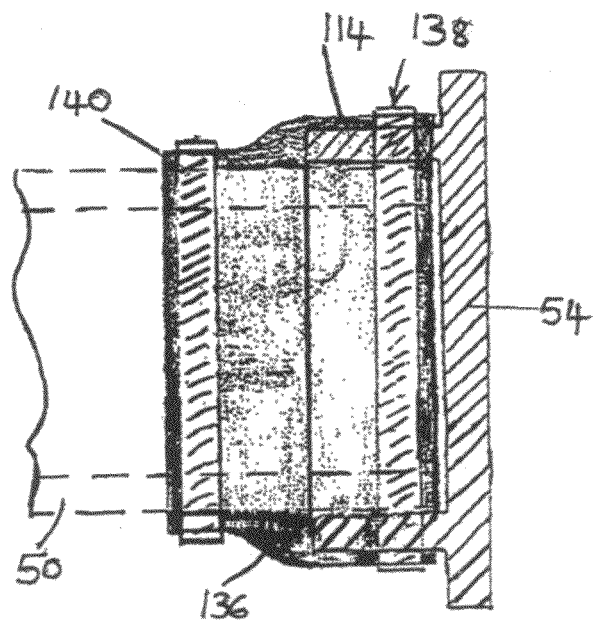
FIG. 14 shows yet a further means of attachment using a flexible sleeve.

With reference to FIG. 14 of the drawings, yet a further embodiment is shown for securing the grate 54 to the pipe 50. The grate 54 has depending side walls 114, and a flexible sleeve 136, of generally tubular shape, extending from just below the outer surface of the grate 54 to over the pipe 50. The sleeve, which can be comprised of flexible rubber, plastic, ABS or any other suitable material, is secured to the grate 54 by means of a clamp 138, and the other side of the sleeve 136 is secured to the pipe 50 by means of another clamp 140. The clamps 138 and 140 are appropriately tightened or loosened in conventional fashion so as to form a ring to firmly clamp the sleeve 136 against the grate 54 and/or the pipe 50 respectively.

With reference to FIG. 15 of the drawings, there is shown a plan view of a grate 160, the grate comprising a more or less elliptically-shaped periphery 162, and a plurality of transverse ribs 164, wherein a pair of adjacent transverse ribs 164 define a slot 166 through which a liquid can be drained. The grate 160 has an upper surface 168 and a lower surface 170 best seen in FIG. 16 of the drawings. Attached to the lower surface 170 of the grate 160, there is formed a flange 172, the flange 172 having a lip 174 formed at one end thereof. The lip 174 defines a space 176 between the lip 174 and the lower surface 170 of the grate 160.

FIG. 16 also shows, in section, a pipe 178 to which the grate 160 is attached. The pipe has an edge 180, which terminates, along a section of the edge 180, in a point or sharpened edge 182.

When contacting the grate 160 to the pipe 178, the point 182 of the edge 180 is inserted into the space 176 by appropriate manipulation of the grate 160. As shown clearly in FIG. 17, the edge 180, and particularly the point 182, is received within the space 176 so as to firmly engage the grate 160. Thereafter, a screw 184, which may also be a bolt or other type of fastening mechanism, is inserted in a bore 186 formed at the approximately opposing end of the grate 160, in the periphery 162 thereof, the screw 184 engaging the edge 180 of the pipe 178 at a point which is more or less diametrically opposite the point at which the edge 180 is received within the space 176.

The embodiment shown in FIGS. 15 to 17 show an efficient mechanism for securing the grate 160 to a pipe 178, which can be accomplished more quickly by virtue of the fact that fewer screws or bolts need be used in the connection process. As will be seen, an automatic fastening mechanism is provided by the flange 172 and lip 174 at one end, so that a screw or bolt-type of fastening mechanism need only be used at the other end.

Reference is now made to FIG. 18 of the drawings, showing another embodiment of the invention. FIG. 18 shows a plan view of a grate 190 having a periphery 192, transverse ribs 194, and slots 196 formed between adjacent ribs 194. The grate 190 illustrated in FIG. 18 is particularly adapted for use on a pipe, where at least the ending thereof has a corrugated configuration, or some kind of protuberances or recesses formed on the pipe, for reasons to be described.

Located in the periphery 192 of the grate 190 are a series, six in FIG. 18, of bores 198 by means of which the grate 190 can be attached to a pipe 200, as more clearly illustrated in FIG. 19 of the drawings. In FIG. 19, it will be seen that the pipe 200 comprises a series of corrugations 202, substantially parallel with each other, which create on the surface a plurality of equispaced recesses 204. In FIG. 19, it will be seen that the grate 190 is fitted over the pipe 200. Securement of the grate 190 to the pipe 200 is effected by means of one or more straps 206. Each strap has a first end 208, and an intermediate portion 210, the intermediate portion 210 extending around the pipe 200, and being accommodated in one of the recesses 204. Further, each strap will also have a second end 212, which would be behind the pipe 200 as illustrated in FIG. 19, so that the pipe 200 is effectively suspended from the grate by means of the straps 206. The first and second ends 208 and 212 of each strap 206 is connected to a bolt 214, the bolt 214 extending upwardly through one of the bores 198. Thus, as an illustration, the middle strap 206, illustrated in FIG. 19, would have a first end 208 connected to a bolt 214 which would extend through bore 198a. The second end 212 of the strap 206 will extend through the bore 198b, shown in FIG. 18. A nut 216, which is accommodated in a recessed area of the bore 198, is threadedly connected to the bolt 214, and appropriate tightening occurs so that, by means of the straps, the pipe 200 is firmly attached to the lower end of the grate 190.

In FIGS. 18 and 19, three straps are shown. However, any number of straps may be used, including a single strap, or four or more straps. The number of straps used may be dependent upon the actual size of the grate and pipe.

Moreover, FIGS. 18 and 19 show a pipe which has a corrugated surface. However, the present embodiment of the invention may provide a grate which is attached to a pipe not necessarily corrugated, but which may have any type of surface configuration to allow one or more of the straps to be attached thereto without sliding or slipping. Thus, the pipe may have a single, or a plurality, of appropriately placed recesses in the surface of the pipe, or it may comprise a bulge or protuberance on the exterior surface of the pipe so that when the strap is attached it will not slide over the pipe. Such a bulge or protuberance may be at a single point, at multiple points or continuously formed around the outer diameter of the pipe.

Figure 20:
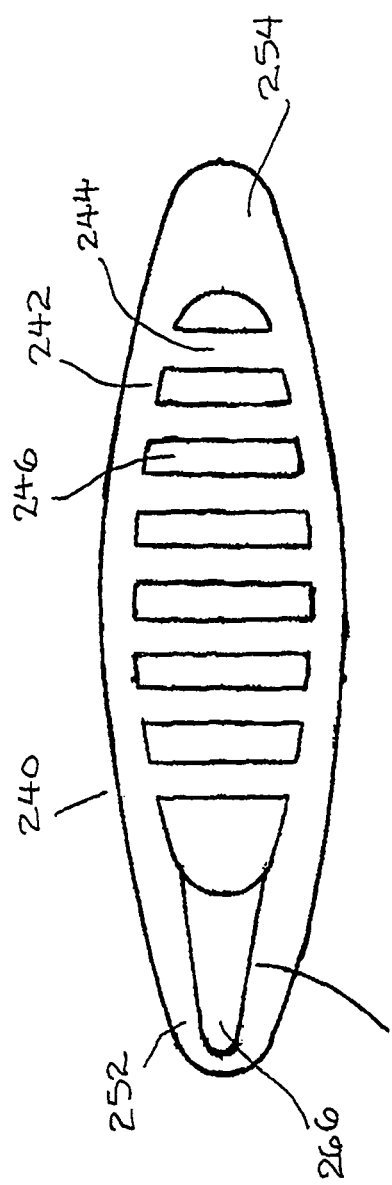
FIG. 20 is a top view of a grate in accordance with another aspect of the invention.

With reference to FIG. 20 of the drawings, there is shown a plan view of a grate 240, the grate comprising a more or less elliptically-shaped periphery 242, and a plurality of transverse ribs 244, wherein a pair of adjacent transverse ribs 244 define a slot 246 through which a liquid can be drained. The grate 240 has an upper surface 248 and a lower surface 250 best seen in FIG. 21 of the drawings. The grate 240 has opposing ends 252 and 254. The grate 240 is intended to cover a pipe 256 having walls 258 cut at one end 260 so as to define an angle other than perpendicular or normal relative to the axis 262 of the pipe 256.

Figure 21:
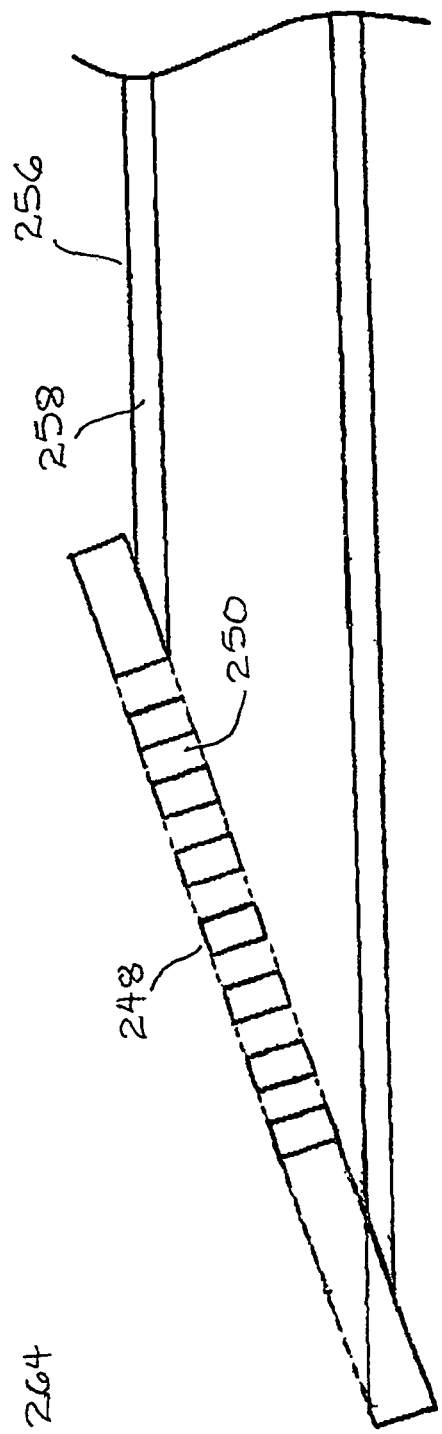
FIG. 21 is a side view in section of the grate as shown in FIG. 20 of the drawings.
Figure 24:
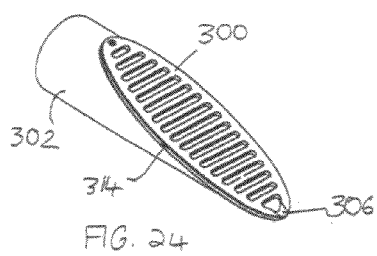
FIG. 24 is a perspective view of a mitered drain cover and pipe in accordance with yet a further embodiment of the invention.

The grate 24 has a slotted channel 264 at the end 252 thereof, and, as best seen in FIG. 21 of the drawings, the slotted channel 264 has a flow surface 266 which facilitates improved flow of liquid from the pipe 256 without any backup at the point where the grate 240 attaches to the pipe 256.

With reference to FIG. 22 of the drawings, there is shown grate 270 including ribs 272 defining slots 274. The grate 270 has a peripheral edge 276, and is received within a receiver 278 which has a flange 280 extending inwardly along a portion thereof. Then grate 270 slides under the flange, and that part not under the flange will rest on the receiver. A sets screw 282 may be located at the other end to firmly secure the grate 270 to the receiver.

With reference to FIGS. 24 to 30 of the drawings, there is shown a further embodiment of the mitred drain cover and pipe, in accordance with the invention wherein the grate portion is partially inset into the pipe section. In these Figures, the grate 300 rests on an open end of the pipe 302, the grate 300 resting at least in part in an inset 304, as shown well in FIGS. 26 and 30 of the drawings. The grate 300 has the usual slots as described above with respect to previous embodiments, and at the lower end has a lip 306 forming a type of channel or funnel through which water exiting the pipe 302 can pass through the grate 300 without backing up. The lip 306 is designed so that the open end of the pipe, and particularly near the bottom thereof, has an outlet to prevent backup, and this is bests seen in FIG. 28 of the drawings.

Figure 27:
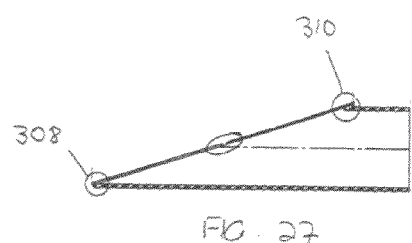
FIG. 27 is a cross-section through the end of the pipe only as shown in FIG. 24 with the drain cover removed.
Figure 25:
FIG. 25 is a side view in section of the drain cover and pipe shown in FIG. 24 of the drawings.
Figure 28:
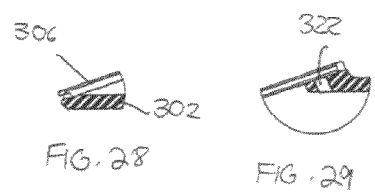
FIG. 28 is a detail of one end of the pipe shown in FIG. 27 of the drawings.
Figure 29:
FIG. 29 is a detail showing another end of the open pipe as shown in FIG. 27 of the drawings; =
Figure 26:
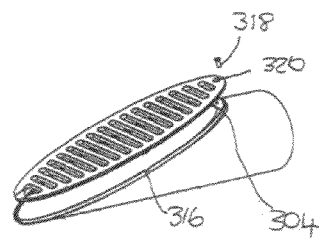
FIG. 26 is a slightly exploded view of the mitred drain cover and pipe shown in FIG. 24 of the drawings, with the drain cover slightly removed from the pipe.
Figure 30:
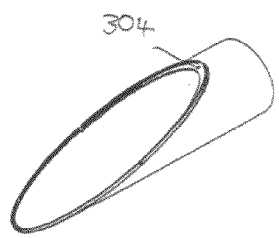
FIG. 30 is top perspective view of the end of the pipe only, as shown in FIG. 24 of the drawings.

FIG. 28 of the drawings shows the end of the pipe including the lip 306, a detail of the circled portion 308 in FIG. 27, while FIG. 29 of the drawings shows a detail of circled portion 310 in FIG. 27 of the drawings.

The grate is attached to the end of the pipe using a tab 314 on the grate, which fits within a slot 316 on the perimeter of the open end of the pipe, and is permanently affixed by means of a screw 318 passing through a hole 320 in the grate 300, and into a bore 322 (best seen in FIG. 29 of the drawings) in the pipe section. Preferably, the tab and slot arrangement is such that both are angled so that the tab may not be removed from the slot under normal circumstances when the grate is fastened into place by means of the screw 318.

Figure 31:
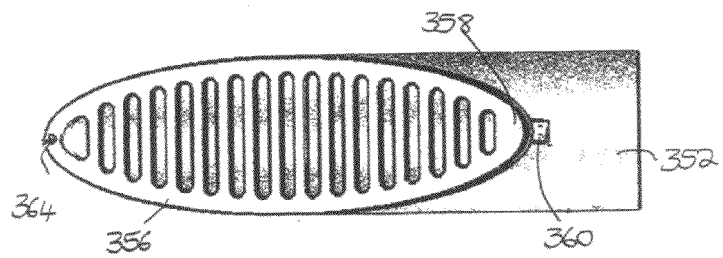
FIG. 31 is a plan view of a grate in accordance with the invention in an embodiment showing a hinged grate.
Figure 32A:
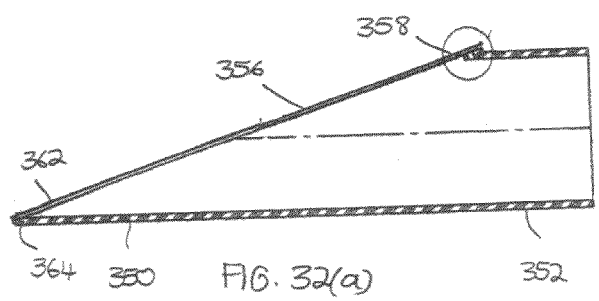
FIG. 32(*a*) is a side view in section of the grate shown in FIG. 31 of the drawings, showing the grate in the closed pdsition.
Figure 32B:
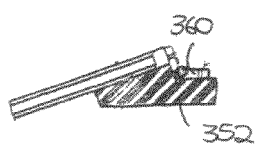
Figure 33A:
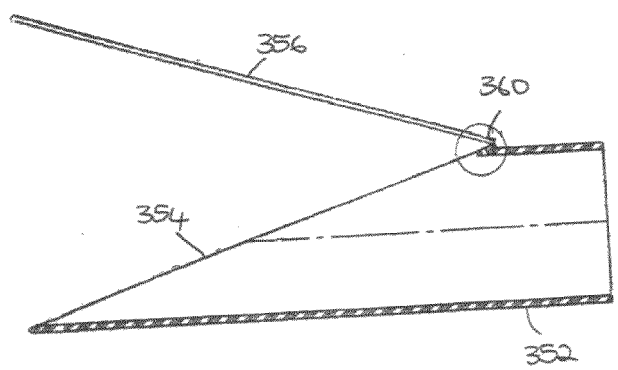
FIG. 33(*a*) is a side view in section of the grate shown in FIG. 31 of the drawings, showing the grate in the open position.
Figure 33B:
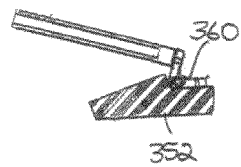

Reference is now made to FIGS. 31 to 33 of the drawings, which shows an embodiment including a hinged grate. In a typical application, the grates generally described in this application are primarily (but certainly not exclusively) for storm drain applications. Storm water can collect and disperse leaves, gravel, silt and other debris. Periodically, the inside of the grates and pipes need to be cleaned for proper functioning. With this in mind, it would be beneficial in certain circumstances to have the capability of removing the grate with the least effort possible yet still retain a secure grate.

The hinged grate in accordance with one embodiment of the invention would allow easy maintenance with removal of only one set screw or other securing device. The hinge will permit the grate to be swung open away from the pipe to allow maintenance. The hinge typically will have two ends. One end attaches to the grate and the other end attaches to the pipe. The hinge can be mounted either on the top portion of the pipe, the bottom portion of the pipe or the side portion of the pipe. The hinge will be held in place by screws, clips, glue, welds or any other securing means.

In FIG. 31 of the drawings, there is shown an end 350 of a pipe 352 having an opening 354. A grate 356 covers the opening 354. The grate 356 is connected at one of its ends 358 to a hinge 360, seen in the detail of FIGS. 32(b) and 33(b) of the drawings. The hinge 360 is also connected to the pipe 352. At the other end 362 of the grate 356, a screw, bolt 364 or other fastening member secures the grate 356 to the pipe 352. If the grate 356 needs to be removed to clean debris or for other maintenance, the screw 364 can be removed, and the grate 356 lifted away form the opening 354 by pivoting it about the hinge 360. In this way, the grate is not disconnected from the pipe 352, but merely moved to expose the opening 354 for maintenance. When the removal of debris has been completed, the grate 356 is rotated about the hinge 360 back to its closed position to cover the opening 354 and secured to the pipe 352 by the screw 364. In this way, a convenient and efficient mechanism for clearing the opening and pipe is provided.

It should also be appreciated that the grate may be constructed so as to fit on to a very significant range of pipes and ground slopes. In one preferred embodiment, the grate may be manufactured to match a 2:1 ground slope. In another application, the grate can be applied to larger pipes to prevent access into the pipe by animals and/or children. Furthermore, the tubing or piping which is cut at an angle may be square or rectangular in cross section, or indeed any other desired on convenient shape, not limited to the circular shape described above.

The invention is not limited to the precise constructional details described herein.

The invention claimed is:

1. A drain cover comprising:
   a grate having peripheral edge defining a space having an axis substantially normal to the peripheral edge and at least one cross piece extending within the space at substantially right angles to the axis of the space;
   a sidewall having an axis, the sidewall extending from the lower surface of the grate, and constructed such that the axis of the space and the axis of the sidewall are other than parallel to each other, and wherein the peripheral edge and sidewall define a receiving space for receiving a pipe having an open end which is received within the space; and a hinge member on the grate such that the grate can be pivotally rotated about the hinge to permit the grate to be lifted off an opening which the grate in use covers.

2. A grate as claimed in claim 1 further comprising securing means for securing the grate to a pipe.

3. A mitred grate and drain cover comprising:

an elliptical peripheral edge defining a space, the space having an axis substantially normal to the peripheral edge, and at least one cross piece located in the space so as to define a plurality of openings in the grate; and securing means including a hinge for securing the grate to an end of a pipe which has a longitudinal axis, the grate when secured to the pipe being such that the axis of the space and the longitudinal axis of the pipe are other than parallel to each other.

4. A drain cover and pipe combination, the combination comprising:

a drain cover including an elliptical shaped frame portion defining a space, the space having an axis substantially perpendicular to the frame, and at least one cross piece located in the space so as to define a plurality of openings in the drain cover;

a pipe comprising a correspondingly shaped member having a longitudinal axis, the pipe having a shaped rim at one end thereof with a rim axis which is other than parallel to the longitudinal axis of the tubular member; and securing means including a hinge for securing the grate to the end of the pipe, the grate when secured to the pipe being such that the axis of the space and the longitudinal axis of the pipe are other than parallel to each other.

5. A drain cover and pipe combination as claimed in claim 4 further comprising an opening located at or near an end of the grate to permit flow therethrough and reducing or minimizing the amount of back up in the pipe, and wherein the lower surface of the drain cover comprises at least one guide member to facilitate proper orientation between the drain cover and the pipe.

6. A drain cover and pipe combination as claimed in claim 5 wherein the opening comprises a lip tangential to the end of the grate.

7. A drain cover and pipe combination as claimed in claim 6 wherein the lip is channel shaped.

8. A drain cover and pipe combination as claimed in claim 4 wherein the drain cover has a plurality of apertures on the frame portion thereof, and the securing means comprises a plurality of screws which pass through the apertures and engage the rim of the pipe.

9. A drain cover and pipe combination as claimed in claim 4 wherein the angle between the rim axis and the axis of the tubular member is selected depending upon the slope or angle of a surface or substrate in which the drain cover may be mounted.

10. A drain cover and pipe combination as claimed in claim 4 wherein the grate has angled tabs and the pipe has corresponding angled recesses for fitting the grate to the pipe.

* * * * *